United States Patent [19]
Koubuchi et al.

[11] Patent Number: 6,085,604
[45] Date of Patent: Jul. 11, 2000

[54] METHOD AND APPARATUS FOR DETERMINING SUCCESS OR FAILURE OF PRESS FITTING

[75] Inventors: Kenji Koubuchi, Nishinomiya; Yoshiaki Hagihara, Matsubara, both of Japan

[73] Assignee: Taiyo Ltd., Osaka-fu, Japan

[21] Appl. No.: 09/354,153

[22] Filed: Jul. 16, 1999

[30] Foreign Application Priority Data

Dec. 1, 1998 [JP] Japan .................................. 10-341203

[51] Int. Cl.⁷ .................................................. B23Q 17/00
[52] U.S. Cl. .......................................................... 73/865.8
[58] Field of Search ........................ 73/865.8; 29/407.08, 29/525

*Primary Examiner*—Robert Raevis

[57] ABSTRACT

A method of determining the success or failure of the press fitting a workpiece into an object member having a contact end by a linearly-driven plunger is disclosed. In a predetermined stroke range RM of the plunger press fitting the workpiece, thrust information S1 and position information S2 are acquired. The position where the ratio of change of the thrust information S1 with respect to the position information S2 exceeds a predetermined value is detected as an almost press fit end position LLP. The success or failure of the press fitting work is determined according to whether the thrust information S1 is included in a predetermined range of a section from a predetermined determination start position LLH to a determination end position LLQ during the press fitting work. The determination end position LLQ is determined based on the almost press fit end position LLP. The press fitting force is determined at a position nearest to the contact end, thereby making it possible to determine the success or failure of the press fitting work accurately.

8 Claims, 5 Drawing Sheets

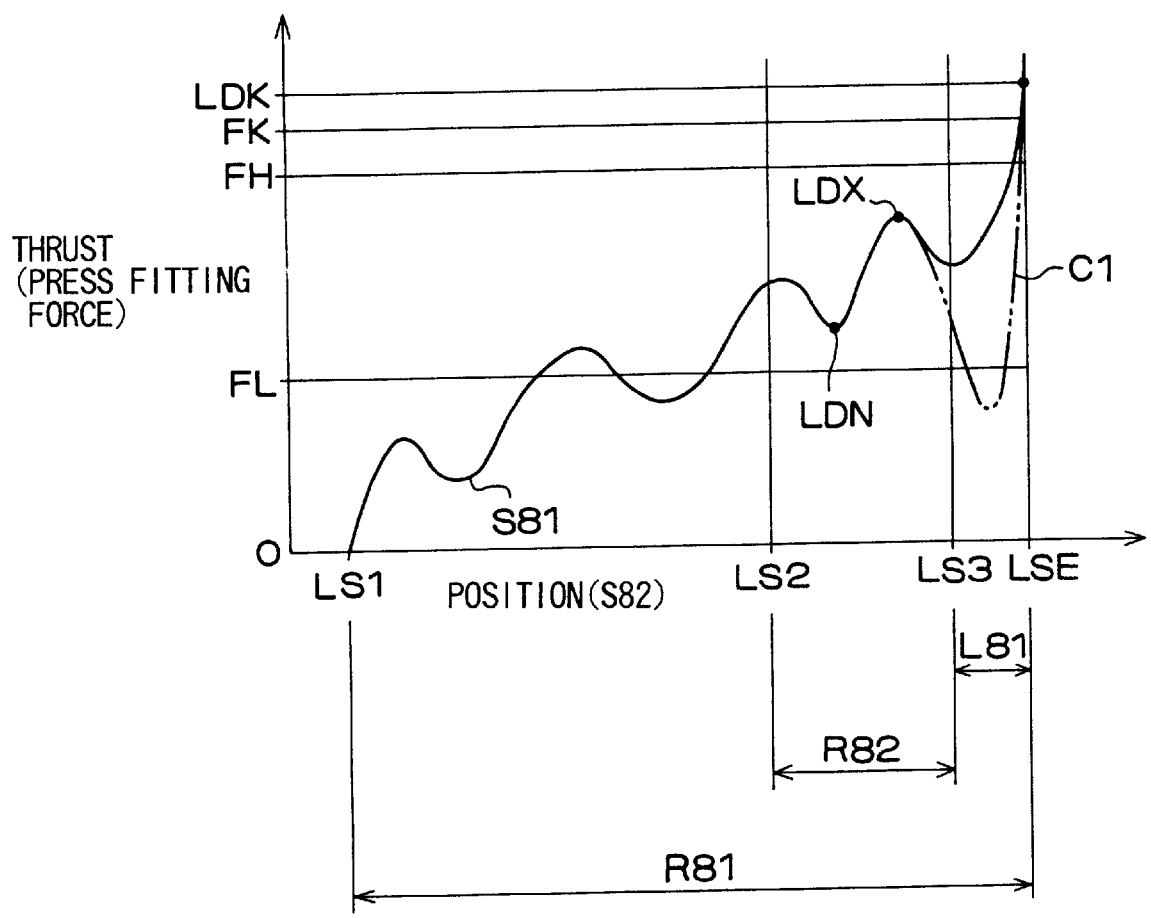

METHOD AND APPARATUS FOR DETERMINING SUCCESS OR FAILURE OF PRESS FITTING

BACKGROUND OF THE INVENTION

1. Field of the Invention

The present invention relates to a method and an apparatus for determining whether a workpiece has been successfully or has failed to be press fitted by the thrust of a plunger linearly driven.

2. Description of the Prior Art

FIG. 4 is a diagram showing a configuration of a press fitting system 90 using a conventional determining apparatus 80, and FIG. 5 is a diagram for explaining the operation of the determining apparatus 80. In FIG. 5, the ordinate represents the thrust LD of a cylinder CY, i.e. the press fitting force of a plunger PR, and the abscissa represents the position LS of the plunger PR.

As shown in FIG. 4, the press fitting system 90 includes the cylinder CY for press fitting, a load cell 81, a position sensor 82, amplifiers 83, 84, a peak hold unit 85, a setting unit 86, a determining unit 87 and a sequencer 88. The plunger PR is mounted at the forward end of a piston rod PD of the cylinder CY. An object member BZ is arranged under the cylinder CY.

With a workpiece WK placed at a press fitting position AP of the object member BZ, the cylinder CY is driven to move the plunger PR downward. In this way, the workpiece WK is press fitted into the object member BZ. The object member BZ has a contact end KT adapted to contact the workpiece WK. Until the lower end surface of the workpiece WK comes into contact with the contact end KT, the plunger PR moves along a press fitting section 81 extending from a press fitting start position LSI to a press fitting end position LSE.

The load cell 81 detects the thrust LD of the cylinder CY, i.e. the force of the plunger PR for press fitting the workpiece WK. The amplifier 84 amplifies the output signal of the load cell 81 and outputs a thrust signal S81.

The position sensor 82 detects the position of the piston rod PD of the cylinder CY thereby to detect the position LS of the plunger PR and the workpiece WK. The amplifier 83 outputs a position signal S82 in response to the output of the position sensor 82.

The peak hold unit 85, as shown in FIG. 5, detects and holds a maximum peak thrust signal LDX and a minimum peak thrust signal LDN on the thrust force curve S81 in a press fitting force determining section R82.

The setting unit 86 has preset therein a maximum peak thrust reference value FH, a minimum peak thrust reference value FL and a thrust reference value FK at the contact end.

The determining unit 87 compares the maximum peak thrust reference value FH with the maximum peak thrust signal LDX and the minimum peak thrust reference value FL with the minimum peak thrust signal LDN. Also, the determining unit 87 compares the thrust signal LDK at the press fitting end position LSE with the thrust reference value FK at the contact end.

In the case where the thrust signal LDX is not more than the thrust reference value FH and the thrust signal LDN is not less than the thrust reference value FL, it is determined that the workpiece WK has been press fitted under a predetermined press fitting force. Also, in the case where the thrust signal LDK is not less than the thrust reference value FK, it is determined that the lower end surface of the workpiece WK has come into contact with the contact end KT. Once these two conditions are met, it is determined that the result of press fitting is "successful", and the control signal CS1 to that effect is output to the sequencer 88. In accordance with the control signal CS1, the sequencer 88 outputs a command required for the next press fitting session to the cylinder CY, etc.

In this way, in the conventional determining apparatus 80, the success or failure of press fitting is determined based on the maximum peak thrust signal LDX and the minimum peak thrust signal LDN in the press fitting force determining section R82.

For determination of the success or failure of the press fitting with a high reliability, it is desirable that the press fitting force determining section R82 is as near to the press fitting end position LSE as possible, i.e. the distance L81 between the determination end position LS3 and the press fitting end position LSE is as small as possible.

In the press fitting system 90, however, the sequencer 88 controls various equipment such as the conveyor for conveying the object member BZ as well as the cylinder CY. Therefore, the response to each equipment is not so high and takes a time as long as several ms to several tens of ms. The process of determining the success or failure of the press fitting also requires a time of about the same length.

Also, the workpiece WK and the object member BZ have a tolerance.

For these reasons, in the case where the distance L81 is too short in the conventional determining apparatus 80, the large load in the vicinity of the contact end KT may be picked up by mistake as a maximum peak thrust signal LDX.

In the prior art, therefore, the distance L81 is set to a comparatively large value, say, about 3 mm to 4 mm. With the increase in the distance L81, however, a press fitting failure is more liable to occur during the particular section, often resulting in a correspondingly higher determination error. In other words, the press fitting may be determined as a "success", even in the case where the actual press fitting force decreases and the thrust signal S81 decreases below the thrust reference value FL within the distance L81 as shown by a two-dot chain in FIG. 5.

SUMMARY OF THE INVENTION

The present invention has been developed in view of the above-mentioned problem, and the object thereof is to provide a method and an apparatus for determining the success or failure of the press fitting work accurately by detecting the press fitting force at a position as near to the contact end as possible.

According to a preferred embodiment of the invention, there is provided a method for determining the success or failure of press fitting the workpiece WK into an object member BZ having a contact end KT by the plunger PR, comprising the steps of acquiring the thrust information S1 and the position information S2 of the plunger PR press fitting the workpiece WK in a predetermined stroke range RM, detecting an almost press fit end position LLP where the rate of change RS of the thrust information S1 with respect to the position information S2 exceeds a predetermined value BPI, and determining the success or failure of the press fitting according to whether the thrust information S1 is included within a predetermined range in the section between a predetermined determination start position LLH and the determination end position LLQ during the press fitting process while at the same time determining the determination end position LLQ based on the almost press fit end position LLP.

According to another preferred embodiment of the invention, there is provided an apparatus for determining the success or failure of the press fitting a workpiece WK into an object member BZ having a contact end KT by a linearly-driven plunger PR, comprising thrust detection means 11 for obtaining the thrust information S1 in a predetermined stroke range RM of the plunger PR, position detection means 12 for obtaining the position information S2 of the plunger PR in the predetermined stroke range RM, storage means 17 for storing the thrust information S1 and the position information S2, almost press fit end position detection means 15a for detecting an almost press fit end position LLP where the ratio RS of change of the thrust information S1 with respect to the position information S2 exceeds a predetermined value BPI, determining means 15b for determining whether the press fitting is successful or not according to whether the thrust information is included in a predetermined range for a section from a predetermined determination start position LLH to a determination end position LLQ in the press fitting process, and range setting means 16 for determining the determination end position LLQ based on the almost press fit end position LLP.

BRIEF DESCRIPTION OF THE DRAWINGS

FIG. 5 is a diagram for explaining the operation of a conventional determining apparatus.

DESCRIPTION OF THE PREFERRED EMBODIMENTS

Figure 1:
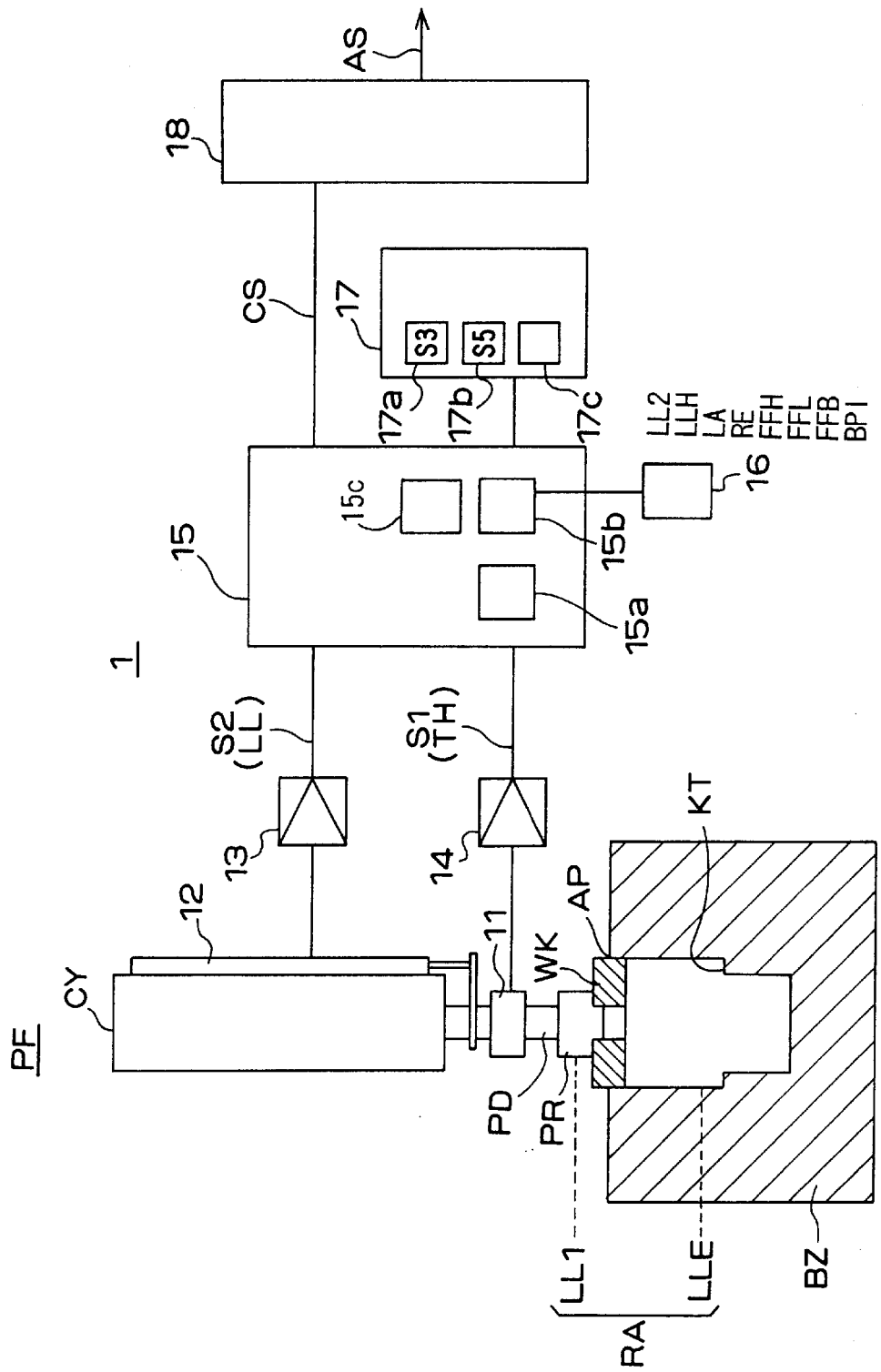
FIG. 1 is a diagram showing a configuration of a press fitting system using a determining apparatus according to this invention.
Figure 2:
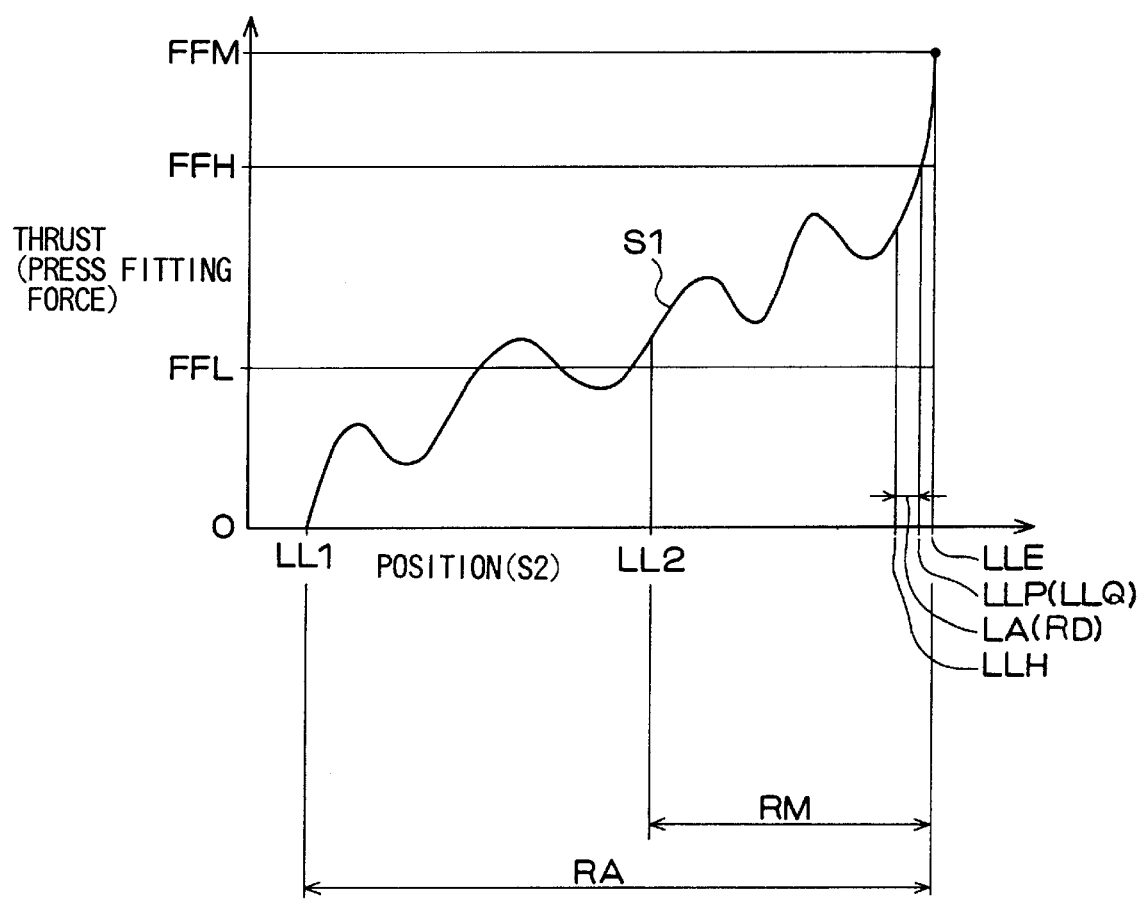
FIG. 2 is a diagram for explaining the operation of the determining apparatus according to this invention.
Figure 3:
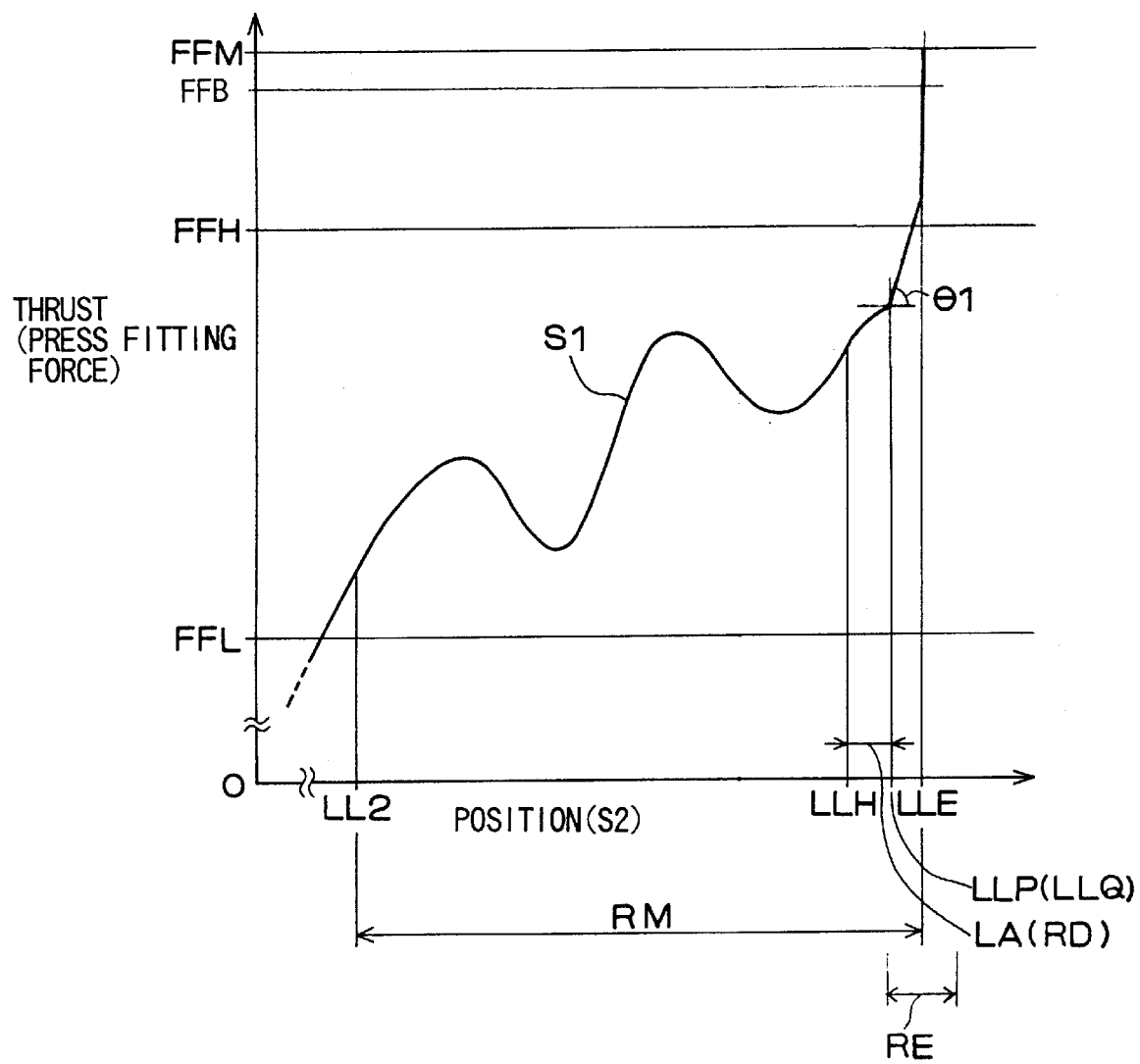
FIG. 3 is an enlarged view of the essential parts of FIG. 2.
Figure 4:
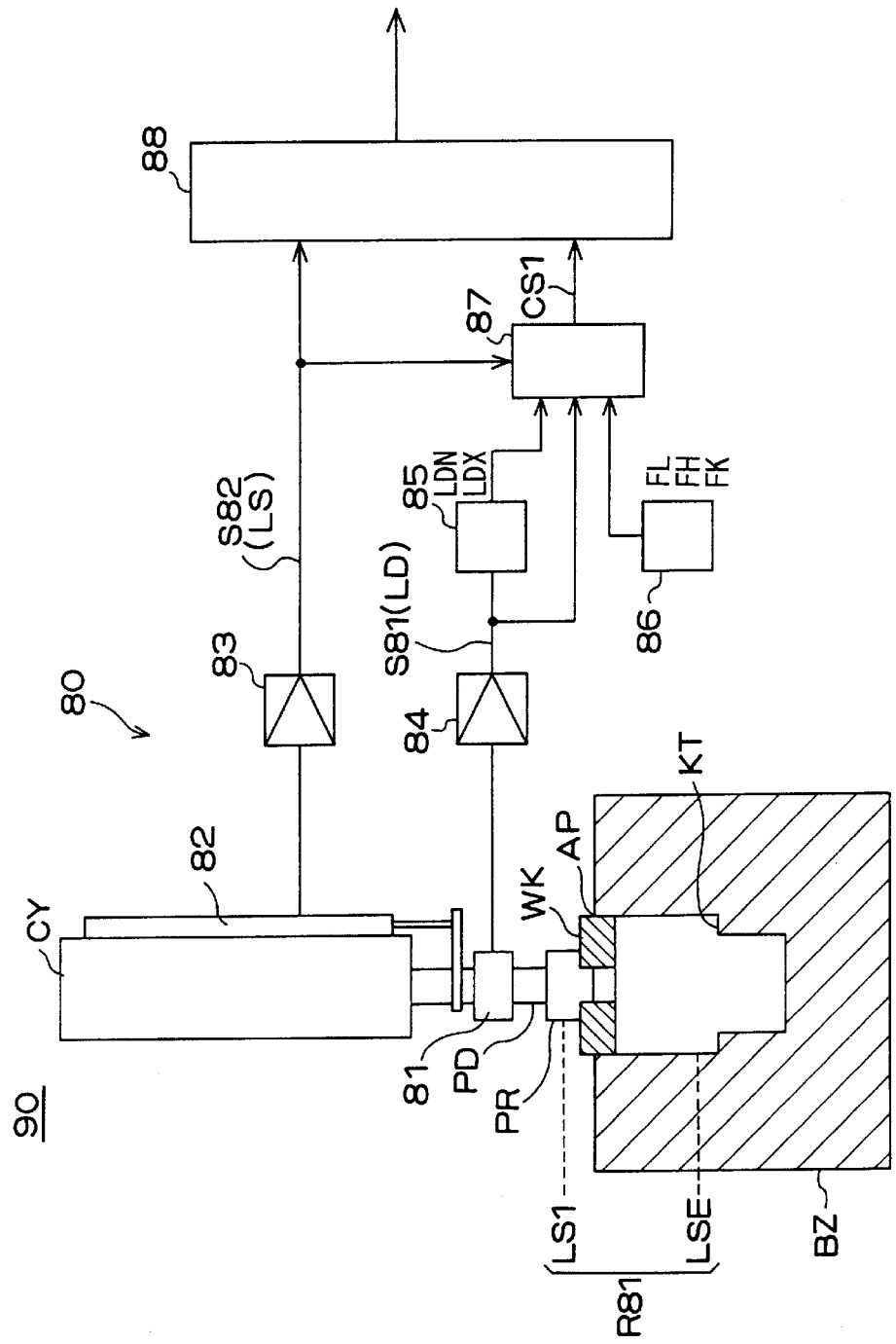
FIG. 4 is a diagram showing a configuration of a press fitting system using a conventional determining apparatus.

FIG. 1 is a diagram showing a configuration of a press fitting system PF using a determining apparatus 1 according to this invention, FIG. 2 is a diagram for explaining the operation of the determining apparatus 1, and FIG. 3 is an enlarged view of the essential parts of FIG. 2. In FIGS. 2 and 3, the ordinate represents the thrust TH of the cylinder CY, i.e. the press fitting force of the plunger PR, and the abscissa represents the position LL of the plunger PR.

As shown in FIG. 1, the press fitting system PF includes a press fitting unit, a determining apparatus 1 and a sequencer 18. The press fitting unit includes a cylinder CY, a load cell 11 and a position sensor 12. The determining apparatus 1 includes amplifiers 13, 14, an arithmetic processing unit 15, a setting unit 16 and a memory 17. The determining apparatus 1 can be configured of a CPU, a ROM, a RAM or other memories for storing an appropriate program, peripheral units and an appropriate hardware circuit.

The plunger PR is mounted at the forward end of the piston rod PD of the cylinder CY. An object member BZ is arranged under the cylinder CY.

With the workpiece WK placed at the press fitting position of the object member BZ, the cylinder CY is driven to move the plunger PR downward thereby to press fit the workpiece WK into the object member BZ. The object member BZ has a contact end KT adapted to contact the workpiece WK, and the plunger PR moves in the press fitting section RA from the press fitting start position LL1 to the press fitting end position LLE until the lower end surface of the workpiece WK comes into contact with the contact end KT.

The load cell 11 is mounted midway of the piston rod PD for detecting the thrust TH of the cylinder CY, i.e. the force of the plunger PR for press fitting the workpiece WK. The amplifier 14 amplifies the output signal of the load cell 11 and outputs the thrust signal S1.

The position sensor 12 detects the position of the piston rod PD in the cylinder CY thereby to detect the position LS of the plunger PR and the workpiece WK. The amplifier 13 outputs the position signal S2 in response to the output of the position sensor 12.

The arithmetic processing unit 15 includes an almost press fit end position detection and calculation unit 15a, a determination calculation unit 15b and a range setting unit 15c for determining the success or failure of the press fitting, determining whether the lower end of the workpiece WK has almost come into contact with the contact end KT and sending a control signal CS to the sequencer 18. The process performed by the arithmetic processing unit 15 will be described later.

The setting unit 16 is for setting the values of the data acquisition start position LL2, the determination start position LLH, the distance LA, the press fitting end determination range RE, the maximum thrust reference value FFH, the minimum thrust reference value FFL, the press fitting end thrust determination value FFB and the almost press fit end inclination BPI.

The data acquisition start position LL2 is the position of the plunger PR where the memory 17 starts to store the thrust signal S1 and the position signal S1. In other words, the data between the data acquisition start position LL2 and the press fitting end position LLE (data acquisition section RM) is stored in the memory 17.

The determination start position LLH is the position of the plunger where the success or failure of the press fitting begins to be determined. The determination start position LLH is located the distance LA this side of the determination end position LLQ described later. The success or failure of the press fitting is determined according to whether the value of the thrust signal S1 is in a predetermined range in the determination section RD from the determination start position LLH to the determination end position LLQ during the press fitting operation.

It is determined whether the press fitting end position LLE is included in the press fitting end position determination range RE, thereby determining whether the press fitting end position LLE, i.e. the contact end assumes a normal position.

The maximum thrust reference value FFH is the maximum value of the thrust signal providing a criterion for determining whether the press fitting is a "success" or not. The minimum thrust reference value FFL is the minimum value of the thrust signal providing a criterion for determining whether the press fitting is a "success." The almost press fit end inclination BPI is a reference value for determining whether the lower end of the workpiece WK is immediately before coming into contact with the contact end KT.

The press fitting end thrust determination value FFB, on the other hand, is a reference value for determining whether the press fitting force of the plunger PR has reached the maximum value FFM of the thrust TH of the cylinder CY. When the press fitting end thrust determination value FFB is exceeded, it is determined that the maximum value FFM has been reached. In the case where the press fitting end thrust determination value FFB has been exceeded, it indicates that the press fitting end position LLE, i.e., the contact end KT has been normally reached.

The memory 17 includes a thrust signal storage unit 17a, a position signal storage unit 17b and a set value storage unit 17c. The thrust signal storage unit 17a stores the thrust signal S1 for the data acquisition section RM from the data acquisition start position LL2 to the press fitting end position LLE. The position signal storage unit 17b stores the position signal S2 for the data acquisition section RM. The position signal S2 is stored with a corresponding thrust signal S1.

The set value storage unit 17c stores the data acquisition start position LLW set by the setting unit 16, the determination start position LLH, the press fitting end position determination range RE, the maximum thrust reference value FFH, the minimum thrust reference value FFL, the press fitting end thrust determination value FFB and the almost press fit end inclination BPI.

The sequencer 18 controls the whole press fitting system PF based on the control signal CS sent from the arithmetic processing unit 15.

Now, the operation and the processing of the arithmetic processing unit 15 will be explained.

The almost press fitting end position detection and calculation unit 15a detects an almost press fit end position LLP where the ratio of change (change rate) RS of the thrust signal S1 with respect to the position signal S2 for the data acquisition section RM exceeds the almost press fit end inclination BPI. The value of the almost press fit end inclination BPI is tan θ1 in FIG. 3. The ratio RS can be determined by determining the inclination of a straight line defined by a plurality of successive data stored in the thrust signal storage unit 17a and the position signal storage unit 17b.

The almost press fit end position LLP is considered to be a position where the lower end surface of the workpiece WK begins to contact the contact end KT. Then, the determination end position LLQ is determined based on the almost press fit end position LLP. According to this embodiment, the almost press fit end position LLP coincides with the determination end position LLQ. The determination start position LLH is determined which is located a predetermined distance LA this side of the determination end position LLQ. The distance LA is set to about 0.1 mm, for example.

The determination calculation unit 15b compares the thrust signal S1 stored in the thrust signal storage unit 17a with the maximum thrust reference value FFE and the minimum thrust reference value FFL stored in the set value storage unit 17c for the determination section RD from the determination start position LLH to the determination end position LLQ. In the case where the thrust signal S1 is between the minimum thrust reference value FFL and the maximum thrust reference value FFH inclusive, it is determined that the workpiece WK has been press fitted under a predetermined press fitting force.

Further, in the case where the thrust TH of the cylinder CY exceeds the press fitting end thrust determination value FFB and the press fitting end position LLE is included in the press fitting end position determination range RE, it is determined that the press fitting has been performed normally and that the press fitting result is a "success" so that the control signal CS to that effect is output.

The sequencer 18 outputs a command AS required for the next press fitting session to the cylinder CY, etc. in real time in response to the control signal CS.

As described above, the success or failure of the press fitting result is determined for the determination section RD based on the thrust signal S1 and the position signal S2 stored in the memory 17 for the data acquisition section RM.

Thus, not only the minimum or maximum peak point and the reference point are compared with each other as in the prior art, but the whole data stored can be determined, thus making it possible to determine the success or failure of the press fitting work accurately.

In determining the determination end position LLQ, on the other hand, the ratio RS of the thrust signal S1 to the position signal S2 is compared with the almost press fit end inclination BPI to determine the almost press fit end position LLP, and the determination end position LLQ is determined based on the almost press fit end position LLP. Specifically, the determination end position LLQ is not determined fixedly, but by detecting the actual press fitting condition, actually measuring the position where the workpiece WK begins to contact the contact end KT and based on the result of the particular actual measurement. Thus, the determination end position LLQ can be approximated to the actual contact end KT in maximum, so that the press fitting force can be determined at point a correspondingly proximate to the contact end KT. Accurate determination of the success or failure of the press fitting work is thus possible.

Also, there may be a case where a plurality of workpieces WK are continuously press fitted in contact with each other in the press-fitting direction. Consider the case, for example, in which a plurality of bearings are sequentially press fitted into a single hole. The tolerance of the width of each bearing is accumulated. In the case where the determination end position LS3 is fixedly determined as in the prior art, therefore, the effect of the tolerance accumulation makes an accurate determination difficult. In the determining apparatus 1 according to this embodiment, on the other hand, the determination end position LLQ is determined based on the result of actual measurement of the position where the workpiece WK begins to contact the contact end KT. Therefore, the tolerance accumulation of the workpieces WK exhibits no adverse effect, and accurate determination is possible of the success or failure of the press fitting work. In other words, the press fitting end position determination range RE of the next one of successive workpieces WK is set according to the press fitting end position LLE actually measured. Thus, the tolerances of the workpieces WK are not accumulated in determination, and an accurate determination is made possible.

In this way, with the determination apparatus 1 according to this embodiment, the reliability of determination as to the success or failure of the press fitting work can be improved.

In the embodiment described above, the data acquisition section RM is set from the data acquisition start position LL2 to the press fitting end position LLE. Alternatively, the data acquisition start position can be set at the press fitting start position LL1, for example, thereby to widen the data acquisition section RM. Also, the data acquisition section RM can be made to coincide with the determination section RD. Further, the determination section RD can be widened.

According to the embodiment described above, the determination end position LLQ is made to coincide with the almost press fit end position LLP. These positions, however, can be different from each other. For example, the determination end position LLQ can be a predetermined length this side of the almost press fit end position LLP. The predetermined length is about 0.1 mm, for example.

The success or failure of the press fitting can alternatively be determined according to the waveform patterns of the position signal S2 and the thrust signal S1 in the determination section RD. The plunger PR can assume various any of various shapes, dimensions and the materials. Instead of mounting the plunger PR at the forward end of the piston rod PD as in the embodiment described above, it can be mounted integrally with the piston rod PD. The load cell 11 can be mounted on the head of the cylinder CY. Also, the load cell 11 can be interposed between the cylinder CY and the frame on which the cylinder CY is mounted.

According to the embodiment described above, the configuration, structure, dimensions, shape, material and the quantity of the whole or part of the determination apparatus 1 and the press fitting system PF can be variously modified without departing from the scope and spirit of the invention.

What is claimed is:

1. A method of determining the success or failure of the press fitting of a workpiece into an object member having a contact end by a linearly-driven plunger, comprising the steps of:

acquiring the thrust information and the position information of said plunger when said plunger press fits said workpiece in a predetermined stroke range;

detecting an almost press fit end position where the ratio of change of said thrust information with respect to said position information exceeds a predetermined value;

determining the success or failure of the press fitting work according to whether said thrust information is included in a predetermined range of a section from a predetermined determination start position to a determination end position during the press fitting work; and determining said determination end position according to the almost press fit end position detected.

2. A method of determination according to claim 1, wherein said determination end position coincides with said almost press fit end position.

3. A method of determination according to claim 1, wherein it is determined that the press fitting result is successful on condition that said plunger has reached said press fitting end position.

4. A method of determination according to claim 1, wherein it is determined that the press fitting result is successful on condition that said plunger has reached said press fitting end position and further that said press fitting end position is included in a preset press fitting end position determination range.

5. An apparatus for determining the success or failure of the press fitting of a workpiece into an object member having a contact end by a linearly-driven plunger, comprising:

thrust detection means for acquiring the thrust information in a predetermined stroke range of said plunger;

position detection means for acquiring the position information in a predetermined stroke range of said plunger;

storage means for storing said thrust information and said position information;

almost press fit end position detection means for detecting an almost press fit end position where the ratio change of said thrust information with respect to said position information exceeds a predetermined value;

determination means for determining the success or failure of the press fitting work according to whether said thrust information is included in a predetermined range of a section from a predetermined determination start position to a determination end position during the press fitting work; and range setting means for determining said determination end position based on said almost press fit end position.

6. A determination apparatus according to claim 5, wherein said range setting means sets said determination end position at the same position as said almost press fit end position.

7. A determination apparatus according to claim 5, wherein said determination means determines that the press fitting result is successful on condition that said plunger has reached the press fitting end position.

8. A determination apparatus according to claim 5, wherein said determination means determines that the press fitting result is successful on condition that said plunger has reached the press fitting end position and that said press fitting end position is included in a preset press fitting end determination range.

* * * * *